May 22, 1973 W. D. RYAN 3,734,800
METHOD OF LAMINATING CONTINUOUS MATERIAL
Filed June 19, 1970
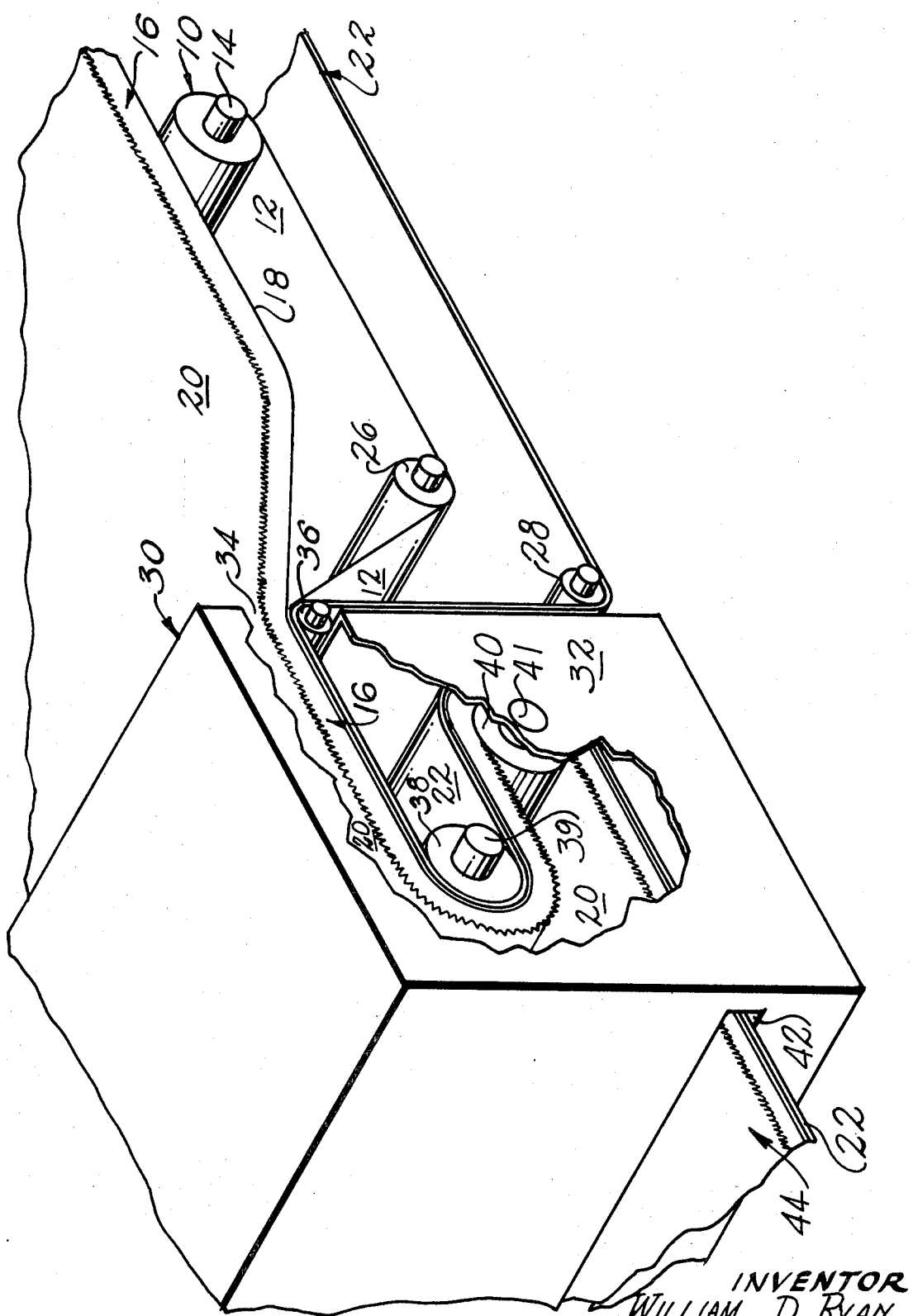
INVENTOR
WILLIAM D. RYAN
BY Patrick F. Henry
ATTORNEY 3,734,800
METHOD OF LAMINATING CONTINUOUS MATERIAL
William D. Ryan, Calhoun, Ga.
(4285C N. Shallowford Road, Chamblee, Ga. 30341)
Filed June 19, 1970, Ser. No. 47,809
Int. Cl. C09j 7/00
U.S. Cl. 156—309                                      7 Claims

ABSTRACT OF THE DISCLOSURE

A method of laminating primary and secondary sheet material particularly laminating tufted carpet goods with a secondary carpet backing to replace the liquid adhesive and other methods presently employed. A sheet of thermoplastic material such as a hot-melt polymer is interposed between the carpet and the backing material continuously as the carpet and backing material are run and then the laminated sheets are placed in an oven to melt the thermoplastic material thereby bonding the secondary carpet backing to the primary carpet backing.

BACKGROUND OF THE INVENTION

(1) Field of the invention

Generally, laminating continuous, flexible sheets. Particularly carpet and textile goods and applying a secondary backing material to a primary carpet backing.

(2) Description of the prior art

The primary carpet backing material in the form of continuous, flexible goods is run continuously over rolls in a pan containing latex and is then pressed or married to a jute secondary backing material also running continuously in superposed relation to said primary carpet backing material. The combined primary carpet backing material with latex superimposed with the secondary jute backing material is run through an oven (typical temperature range 225° F. to 400° F. approx.) to dry the latex adhesive thereby completing the application of the secondary backing material onto the primary carpet backing making a continuous piece of carpet goods. The temperature range is due to variables such as type of fiber, speed, and substrate character. More recently, in lieu of latex, hot-melt polymers are used in the same manner. Latex has an odor and is soft and sometimes the bond is not complete or homogeneous and there is fuzzing, pilling and breaking of fibers. Sometimes there are latex bubbles or bulges or separation of the primary carpet and the secondary backing material. Time is required to cook or cure latex and the ovens must provide this. While the hot-melt polymers eliminate many of these problems, it has been roughly guessed that presently more than an estimated 90% of the carpet manufacturers have latex ovens representing an investment of $75,000.00 to $150,000 or more each. To switch suddenly to the new hot-melt would involve an additional expenditure of $100,000 to $150,000 or more without use of the latex ovens.

SUMMARY OF THE INVENTION

By forming hot-melt polymers or other thermoplastic materials into continuous film or sheets and directing it between the primary carpet backing and the secondary carpet backing, present latex ovens can be used to complete the bonding by heat which eliminates not only the use of a liquid latex but also the use of a liquid of any kind and at the same time is performed on existing latex ovens without new installation. In addition, the film used can be controlled to a finer degree than either liquid latex or liquid hot-melt thereby effecting a cost saving. Conventional latex costs on an average, nine cents (9 cents) per dry pound. The average amount of latex applied to achieve sufficient bond on the carpet is usually twenty-four (24) ounces per square yard. Based on these figures, the average cost of latex is 13.464 cents per square yard. Flowed on hot-melts are slightly higher. According to the present invention, a film only 1 to 10 mils in thickness is sufficient to bond carpet with a jute backing. The total weight of these thin films is in the range of only 2 to 4 ounces per yard. Therefore, it is evident that such a film would effect cost savings using the same chemicals as employed in the hot-melt systems. Existing ovens can be used necessitating only an extra roller for the film.

BRIEF DESCRIPTION OF THE DRAWING

The figure is a diagrammatic view of a typical oven and delivery apparatus for the carpet, secondary backing material and the film.

DESCRIPTION OF THE PREFERRED EMBODIMENT

Thermoplastic material such as hot-melt polymer is produced in continuous lengths typically 1 to 10 mils in thickness and rolled into rolls in widths of 12 to 15 feet and lengths of 1500 feet. A roll designated by reference number 10 is shown in the figure and has a continuous sheet of film 12 thereon. A shaft 14 supports this roll 10 which provides the continuous length of thermoplastic film that may be a hot-melt polymer.

Carpet goods 16 supplied from rolls (not shown) have been produced by any well known method usually on tufting machines by tufting through a backing material 18. Thus, there is a carpet goods 16 which includes a primary backing material 18. The tufted side is designated by number 20 and is a pile material tufted through the backing material 18 which is a primary substrate usually woven jute or synthetic.

A secondary backing material 22 may be woven jute or synthetic supplied from a continuous roll (not shown) and directed substantially in superposed relationship with the carpet goods 16. Secondary backing material 22 is the secondary backing or secondary substrate.

Carpet goods 16 is pulled with the film 12 and the backing material 22 from each respective supply such as the roll 10. The film 12 is directed around a roller 26 between the carpet goods 16 and the backing material 22 which is directed around a roller 28. The three continuous, flexible materials carpet goods 16, primary backing material 18, film 12 and jute secondary backing material 22 are brought together at the latex oven 30 which is the conventional latex oven with an enclosure comprising panels 32 with an entrance 34 through which the merged materials enter from a roller 36. There is heat in the oven sufficient to melt the thermoplastic material 12. To provide time for the heat to effect bonding, there is a roller 38 on shaft 39 about which the merged materials 16, 12 and 22 pass, thence back to another roller 40 on shaft 41 about which the merged materials pass, finally exiting through the exit opening 42 in the oven 32 as a single piece of carpet goods 44 with a permanent backing material 22.

The pressure of the rollers on the merged materials of the carpet material 16, the film 12 and the secondary backing material 22 is sufficient to maintain superimposed relationship until the hot-melt or other thermoplastic material melts in oven 40. The rollers may be adjusted to change the distance therebetween thereby affecting the pull on the carpet 42 and the individual components until merger is effected. Heat can be applied by rollers 36, 38 or 40 in addition to or in lieu of oven 40.

EXAMPLE

Primary backing material run continuously with a secondary jute backing material and laminated by a sheet of hot-melt polymer at a temperature between 225° F. and 400° F. in a conventional latex oven. Pressure applied by the rollers.

Suitable thermoplastic materials include polymers such as the hot-melt polymers. Formulations vary depending upon heat used, speed of the travel and other factors.

A hot-melt adhesive is a bonding agent which achieves a solid state and resultant strength by cooling, as contrasted with other adhesives which will achieve the solid state through evaporation or removal of the solvents. Prior to heating, the adhesive is a 100% solid state thermoplastic, all adhesive. Application of heat brings the material to the liquid state, and after removal of heat, it sets by simple cooling.

Examples of thermoplastic, hot-melts:

(1) coumarone-indene resins
(2) rosin and its derivatives
(3) mineral, vegetable and petroleum waxes
(4) alkyds
(5) terpene resins
(6) ethyl cellulose
(7) heat stable phenol-formaldehyde resins
(8) polyvinyl acetate and its derivatives
(9) butyl methacrylates
(10) polyethylene
(11) polystyrene and styrene co-polymers
(12) polyisobutylene Thermoplastics: a polymer must be fluid liquid at some elevated temperature to meet the requirements as a hot-melt or thermoplastics; yet it must set as a solid. Types are as follows:

(1) acrylic
(2) neoprene latex
(3) nitrile latex
(4) styrene-butadiene latex
(5) natural latex
(6) vinyl phenolic
(7) epoxies The drawing illustrates the carpet entering the oven above or on top of the backing material (jute) of synthetic backing. In some carpet mills this process is reversed, having the backing material on top and the carpet on the bottom. It makes no difference in the operation herein and the invention claimed.

While I have shown and described a particular embodiment of the method and suggested equipment, this is by way of illustration only since there are other ways this can be done and other materials, and there are alterations, changes, revisions, substitutions, omissions, additions, and departures which can be made without departing from the scope of my invention defined in the appended claims.

What is claimed:

1. In a method for laminating a backing material including a jute or synthetic backing material to a material including the primary backing material found in a continuous, flexible carpet goods: directing a continuous sheet film of hot-melt material between said secondary backing material and said primary backing material and then melting said film while said film is between said secondary backing and primary backing by heating the combined primary and secondary backing material and hot-melt to melt said hot-melt, said hot-melt being melted by directing said primary and secondary backing material and hot-melt film through a heated oven hot enough to melt the hot-melt polymer and including a conventional carpet latex oven while maintaining said primary and secondary backing material in superimposed relationship with said hot-melt therebetween.

2. The method in claim 1:
said primary backing material being carpet with a pile surface on one side of the primary backing material; and said secondary backing material being combined therewith and being a sheet material including a natural fibrelike jut or a synthetic material including plastic.

3. The method in claim 1:
said primary backing material being a flexible, textile material including carpet having a decorative surface on one side; said secondary backing also being a continuous, flexible material;
said primary backing material and said secondary backing being directed continuously in spaced superposed relation with said continuous film continuously directed therebetween and said primary backing material, said secondary backing material and said film being merged and superimposed with said film in the middle and said film being melted to bond said primary and secondary backing materials.

4. In a method for attaching a substantially wide primary backing material of continuous length including a continuous carpet goods to a secondary backing material of continuous length and corresponding in width to the primary backing material: directing said primary backing material and said secondary backing material substantially in superposed relation, and prior to bringing said primary backing material and secondary backing material into superimposed relation, directing a sheet of hot-melt material therebetween, after said sheet is in position, bringing said primary and secondary backing materials into engagement respectively with said sheet and while in contact applying heat by directing said primary and secondary backing material and hot-melt film through a hot oven to melt said hot-melt material, then permitting said melted hot-melt material to solidify to attach said primary and secondary backing materials.

5. The method in claim 4: said hot-melt material being a polymer.

6. The method in claim 4: said heat being applied by directing said primary and secondary backing materials and said hot-melt material through a conventional latex carpet oven.

7. The method in claim 4 wherein said sheet of hot-melt material is approximately 1 mil to approximately 10 mils in thickness.

References Cited
UNITED STATES PATENTS

| | | | |
|---|---|---|---|
| 3,563,830 | 2/1971 | Burgess | 156—309 |
| 3,567,544 | 3/1971 | Nichols | 156—309 |

REUBEN EPSTEIN, Primary Examiner

U.S. Cl. X.R.

156—324